UNITED STATES PATENT OFFICE.

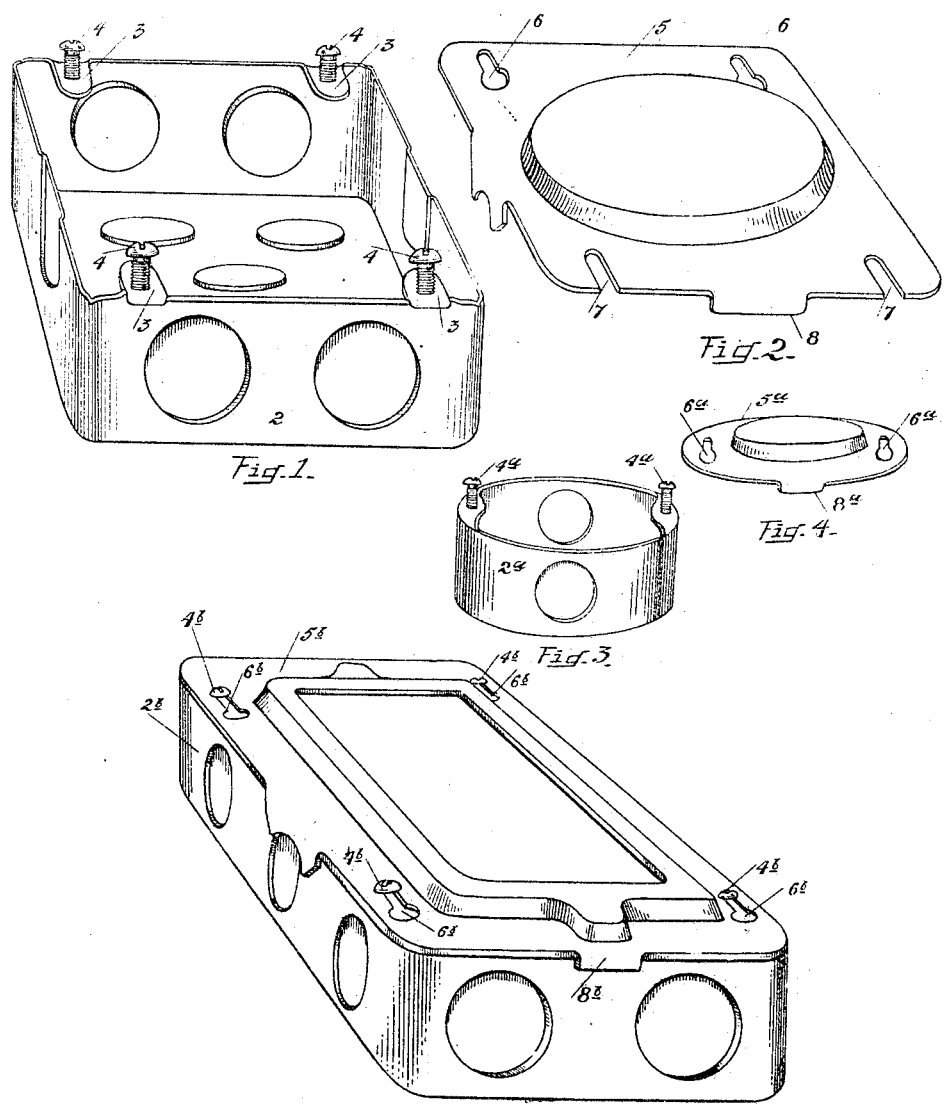

CHARLES T. PRATT, OF FRANKFORT, NEW YORK.

OUTLET OR JUNCTION BOX.

946,646.  Specification of Letters Patent.  Patented Jan. 18, 1910.

Application filed April 19, 1907. Serial No. 369,072.

*To all whom it may concern:*

Be it known that I, CHARLES T. PRATT, of Frankfort, in the county of Herkimer and State of New York, have invented certain new and useful Improvements in Outlet or Junction Boxes; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide an improved outlet or junction box for electric conduits having as its more particular feature the means of applying and securing the cover to the box.

Figure 1 shows a perspective view of one part of the box with the cover removed. Fig. 2 shows a perspective view of the cover of the same. Fig. 3 shows a perspective view of another form of box embodying the features of the invention. Fig. 4 shows a perspective view of the cover for the same. Fig. 5 shows a perspective view of still another form of construction.

Referring to the reference numerals in a more particular description, 2 indicates the body of a junction or outlet box consisting of the usual side walls and bottom, all ordinarily provided with plugged or incomplete openings, at some or all of which the ends of conduits are introduced into the box. The box is provided with inwardly turned ears 3, which in suitable screw threaded openings receive the screws 4. The cover 5 shown in Fig. 2 is adapted to be applied to this box and is provided with the key hole openings 6 adapted to receive one pair of said screws and a pair of slots 7 in the edge adapted to receive the other pair of said screws. The cover is also provided with a short downwardly turned lip 8 which is arranged on the side corresponding with the enlarged end of the key hole openings 6. The screws 4 are relatively long and when run well out from the ears, the cover 5 may be applied, the heads of one pair of screws passing through the enlarged ends of the key openings 6. After being applied in the preliminary position the cover is shifted laterally while being held up (or off) at one edge at least sufficiently to allow the lip 8 to pass by the edge of the wall and to the outside thereof. The lengths of the screws when extended must be sufficient to permit this. When adjusted to the final position described the screws are tightened or screwed in somewhat, thus binding the cover against the edges of the walls and engaging the lips 8 with the wall in such manner as to secure the cover in a most efficient and satisfactory manner against displacement. It is not necessary, however, in order to secure the covers safely in place, that the screws should be screwed in so tight that their heads will impinge against the covers, it only being necessary, in order to prevent displacement of the covers, that they should be screwed in far enough so that the flanges or projections on the covers cannot become disengaged from the walls of the boxes; and thus, when it is necessary to remove the covers, this can be done quickly without requiring tightly set screws to be started in unscrewing the same. It will be noted that the cover is placed (and may be removed also) without removing the screws from their positions in the box and, indeed, the screws may be slightly headed on their inner ends so as to prevent their removal. The construction permits the cover to be applied or removed with facility and without the removal (with liability of loss) of any of the screws, and the operation may be performed in overhead work and other places which are reached with difficulty.

Figs. 3 and 4 show a small round form of box in which only two holding screws 4ᵃ are provided and the cover 5ᵃ is provided with two key hole openings 6ᵃ, 6ᵃ, to receive the same, as well as with the holding lip 8ᵃ adapted to engage the edge of the wall of the box, and prevent lateral displacement of the cover when the screws are tightened to bind the cover on the edges of the wall.

In Fig. 5 is shown a box 2ᵇ having the cover 5ᵇ with four key hole openings 6ᵇ, and the holding lip 8ᵇ. This cover is held to the box in a similar manner to the forms previously described by the screws 4ᵇ, which in this figure are shown set down or tightened. When these screws are loosened, as described with reference to the other constructions, the cover is lifted sufficiently to allow the lip 4ᵇ to pass the edge of the box when it is shifted laterally to bring the enlarged end of the opening to register with the head of the screw when the cover may be removed in an obvious manner.

Still other forms of construction will readily suggest themselves.

What I claim as new and desire to secure by Letters Patent is:

The combination of an outlet box having a set of adjustable holding screws screw-threaded therein with their heads projecting therefrom, and a removable cover having key-hole slots with their larger ends adapted to pass the screw heads and all arranged in parallel lines with said larger ends all arranged in the same direction, said cover having a projection arranged to engage the wall of the box and prevent relative movement of the box and cover in the direction of the length of said slots when said screws are in the narrow portions of said slots and the cover is bound to the box thereby and of a length to permit said wall and projection to be disengaged when the screws are loosened and the cover displaced somewhat laterally from the box, thereby permitting relative movement of the box and cover to bring said screws into the larger ends of said slots.

In witness whereof, I have affixed my signature, in presence of two witnesses, this 16th day of April 1907.

CHARLES T. PRATT.

Witnesses:
GEO. E. RENDELL,
SARAH E. CLARK.